US012697882B2

(12) United States Patent
Tscheng et al.

(10) Patent No.: US 12,697,882 B2
(45) Date of Patent: Aug. 4, 2026

(54) RAIL VEHICLE COMPRISING AN ENERGY STORAGE SYSTEM HAVING AN ENERGY STORAGE DEVICE AND A TRANSFORMER, A METHOD OF OPERATING SUCH A RAIL VEHICLE, AND A METHOD OF ASSEMBLING A TRAIN COMPOSITION COMPRISING A RAIL VEHICLE CARRIAGE

(71) Applicant: STADLER RAIL AG, Bussnang (CH)

(72) Inventors: Jorgen Tscheng, Zürich (CH); Thomas Kägi, Widnau (CH)

(73) Assignee: STADLER RAIL AG, Bussnang (CH)

( * ) Notice: Subject to any disclaimer, the term of this patent is extended or adjusted under 35 U.S.C. 154(b) by 760 days.

(21) Appl. No.: 18/160,143

(22) Filed: Jan. 26, 2023

(65) Prior Publication Data

US 2023/0241979 A1      Aug. 3, 2023

(30) Foreign Application Priority Data

Jan. 27, 2022    (EP) ..................................... 22153758

(51) Int. Cl.
| | |
|---|---|
| *B60L 5/39* | (2006.01) |
| *B61C 9/50* | (2006.01) |
| *B61C 17/06* | (2006.01) |

(52) U.S. Cl.
CPC ...... *B60L 5/39* (2013.01); *B61C 9/50* (2013.01); *B61C 17/06* (2013.01); *B60L 2200/26* (2013.01)

(58) Field of Classification Search
CPC .......... B60L 5/39; B60L 2200/26; B61C 9/50; B61C 17/06
See application file for complete search history.

(56) References Cited

U.S. PATENT DOCUMENTS

2012/0090499 A1      4/2012   Shimada et al.

FOREIGN PATENT DOCUMENTS

| | | | | |
|---|---|---|---|---|
| DE | 102017213306 A1 * | 2/2019 | ............... | B60L 1/00 |
| EP | 3 878 680 A2 | 9/2021 | | |

OTHER PUBLICATIONS

"Railway Applications—Supply voltages of Traction Systems", IEC 60850:2014, Nov. 12, 2014, pp. 1-37, See European Search.
European Search Report Corresponding to 22153758.2 mailed Jul. 11, 2022.
European Search Report Corresponding to 22153758.2 mailed Jul. 19, 2022.

* cited by examiner

*Primary Examiner* — Robert J McCarry, Jr.
(74) *Attorney, Agent, or Firm* — Secant IP, P.L.L.C.

(57)                ABSTRACT

The present invention relates to a rail vehicle (22) comprising an energy storage device and a transformer (18) associated with the energy storage device; a rail vehicle carriage (24) comprising an energy storage device and a transformer (18) associated with the energy storage device; a method of operating a rail vehicle having an energy storage system (15); and a method of assembling a train composition. The rail vehicle (22) includes a rail vehicle carriage (24), traction equipment (6), a high-voltage conductor (5), a current collector (1), and an energy storage system (15) having an energy storage device. The traction equipment (6) comprises at least one traction power converter (9) and at least one traction motor (11). The high-voltage conductor (5) electrically connects the traction equipment (6) to the current collector (1). The energy storage device may be a battery (20).

16 Claims, 6 Drawing Sheets

Figure 1:
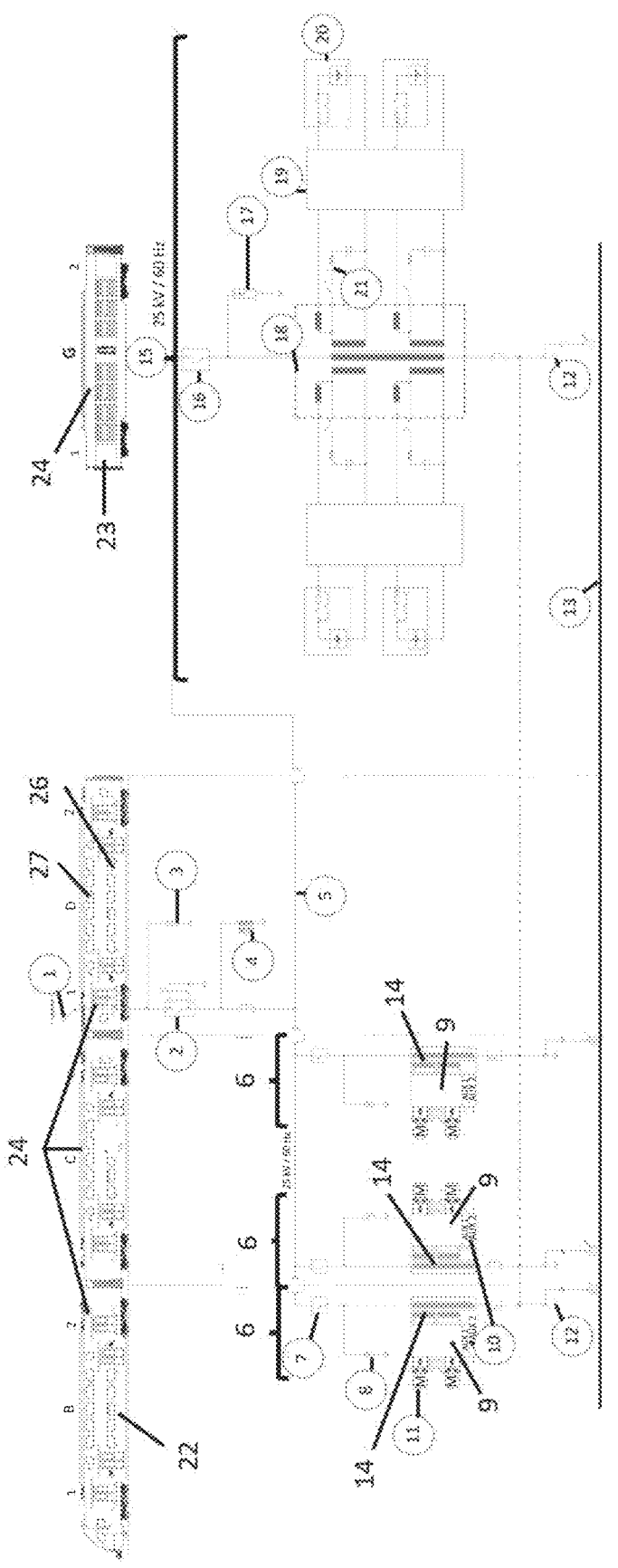

RAIL VEHICLE COMPRISING AN ENERGY STORAGE SYSTEM HAVING AN ENERGY STORAGE DEVICE AND A TRANSFORMER, A METHOD OF OPERATING SUCH A RAIL VEHICLE, AND A METHOD OF ASSEMBLING A TRAIN COMPOSITION COMPRISING A RAIL VEHICLE CARRIAGE

The present invention relates to a rail vehicle comprising an energy storage device and a transformer associated with the energy storage device; a rail vehicle carriage comprising an energy storage device and a transformer associated with the energy storage device; a method of operating a rail vehicle comprising an energy storage system; and a method of assembling a train composition.

Single- or double-deck rail vehicles that are operated both by external energy sources such as overhead lines and by embedded energy sources such as batteries, fuel cells or internal combustion engines are known. The document EP 3 878 680 discloses that the embedded energy source is directly connected to the traction intermediate circuit. DC voltage is thus fed from the battery directly into the intermediate circuit. Furthermore, the battery can be charged by means of the intermediate circuit.

If the embedded energy source, e.g. the battery or the fuel cell, is located far away from the power consumer or the traction inverters, the low battery or DC-link voltage makes it necessary to install heavy, complex power lines. This is particularly disadvantageous for weight reasons. The problem is exacerbated if the embedded energy source is located on a different carriage from the traction converter or power consumers and carriage transitions therefore have to be spanned. Especially at carriage transitions the positioning of heavy power lines is a challenge because of the movable construction of the carriage transitions.

It is the object of the invention to overcome the disadvantages of the prior art and, in particular, to create a rail vehicle in which an embedded energy source can supply a power consumer using as small dimensioned power lines as possible.

The object is achieved by a rail vehicle comprising a rail vehicle carriage, traction equipment, a high-voltage conductor, an energy storage system with an energy storage device and a transformer associated with the energy storage device, and a rail vehicle carriage comprising a high-voltage conductor, an energy storage system with an energy storage device and a transformer associated with the energy storage device, a method for operating a rail vehicle, and a method for assembling a train composition.

In particular, the object is achieved by a rail vehicle comprising a rail vehicle carriage, traction equipment, a high-voltage conductor, a current collector, and an energy storage system with an energy storage device. The traction equipment comprises at least one traction power converter and at least one traction motor. The high-voltage conductor electrically connects the traction equipment to the current collector. The energy storage device may be a battery. The energy storage system comprises a transformer which is associated with the energy storage device and is electrically connected to the energy storage device and to the high-voltage conductor.

Such a rail vehicle enables the high-voltage lead to be dimensioned in a particularly advantageous way. Furthermore, the battery can be charged without applying current to the traction equipment. The traction equipment, the high-voltage conductor and the energy storage system can be arranged on a rail vehicle carriage. The traction equipment, as well as the energy storage system, can also be arranged on separate rail vehicle carriages and connected to the high-voltage conductor.

It is possible that the traction equipment is located on a rail vehicle carriage, the high-voltage conductor is connected to the traction equipment and leads to another rail vehicle carriage, on which the energy storage system is located. It is also possible that the traction equipment is located in the power carriage of a rail vehicle or that the energy storage system is located in the power carriage of a rail vehicle. It is further possible that both the traction equipment and the energy storage system are located in the power carriage of a rail vehicle.

A rail vehicle carriage may be provided substantially for the energy storage system only, with the traction equipment not being located on that carriage. In this case, this rail vehicle carriage essentially has the function of providing energy and there is no seating for passengers in this rail vehicle carriage. However, the rail vehicle carriage preferably remains accessible for passengers for passing the interior of the rail vehicle carriage.

The traction equipment may include one or more traction motors. It is also possible for the traction equipment to include a plurality of traction motors, each of which is located on a bogie, a drive axle, or a wheel.

The energy storage system may comprise a battery. The energy storage system may also comprise a fuel cell or an auxiliary combustion engine. Thus, it is possible that electrical energy is provided by a fuel cell, which is used to operate the rail vehicle. It is also possible that diesel is converted into kinetic energy by a diesel engine and the kinetic energy is converted into electrical energy by induction, the electrical energy serving to operate the rail vehicle. In general it is crucial, that by means of the energy storage system, energy can be stored and made available as electrical energy.

In the rail vehicle, the high-voltage conductor can optionally be supplied with high-voltage alternating current via the current collector by an external power supply and/or by means of the energy storage system.

This has the advantage that the rail vehicle can be operated safely and reliably both by means of an external power supply and by means of an embedded energy source.

The rail vehicle can be designed in such a way that the high-voltage conductor is connected to an external power supply via the current collector without components influencing the voltage in such a way that the high-voltage conductor and the traction equipment can essentially be supplied with the voltage and the frequency of the current of the external power supply.

In this case, there are no heavy and bulky components influencing the voltage between the external power supply and the traction equipment. The fact that the high-voltage conductor is connected to an external power supply via the current collector without any components influencing the voltage means that there is no transformer between the high-voltage conductor and the external power supply. It is of course possible that electrical filters or other electrical components are located between the high-voltage conductor and the external power supply, but these do not substantially affect the voltage.

The high-voltage conductor and the traction equipment of the rail vehicle may be adapted to be supplied with an AC voltage of substantially 25 kV at a frequency of substantially 60 Hz or 50 Hz, preferably 15 kV at a frequency of substantially 16.66 Hz.

This allows the high-voltage conductor and the traction equipment to be subjected to voltages and frequencies that are commonly used in railroad applications.

The energy storage system of the rail vehicle may include an electrical frequency filter. The frequency filter may be located on the primary side of the battery transformer. The electrical frequency filter may also be arranged on the secondary side or on a separate winding of the battery transformer.

However, in order to avoid compatibility problems with DC circuits, e.g. train control, or EMC problems on non-electrified lines, the battery transformer can also allow a different voltage level or frequency to be selected for the traction voltage provided by the batteries.

Likewise, for operation on non-electrified lines, a separate return current path from the negative potentials of the traction and battery transformers can be provided within the vehicle to meet the specifications for interference currents there. The separate return current path is preferably selectively switchable, i.e. the separate return current path can be switched on.

If the separate return current path is not switched on, the return current flows via the rails.

The rail vehicle may have at least one double-deck carriage.

Such a rail vehicle with a double-deck carriage can accommodate a particularly large number of passengers and transport them comfortably.

The rail vehicle may include a plurality of rail vehicle carriages. The at least one battery may be disposed in exactly one battery carriage. The at least one battery may also be arranged in a plurality of the rail vehicle carriages.

By arranging the battery in one or more rail vehicle carriages, a train composition may be advantageously arranged.

The at least one battery may be arranged in exactly one battery carriage. Such a rail vehicle carriage essentially serves the arrangements of the battery and is thus a battery carriage. The battery carriage is accessible for train passengers for passing through the battery carriage, so that train passengers can pass from a rail vehicle carriage arranged in front of the battery carriage to a rail vehicle carriage arranged behind the battery carriage. The battery carriage has no seats for train passengers.

The at least one battery may also be arranged in several of the rail vehicle carriages which, in addition to the battery, are also provided for the accommodation of passengers.

In this case, seating for passengers is also arranged in the rail vehicle carriage with the battery. Such a rail vehicle carriage with a battery can also be passed by passengers in the interior. It is also possible that the batteries are arranged in a power carriage.

The rail vehicle carriage having the battery may include a lower level and an upper level. The battery may be arranged on the lower level. The upper level may include an accommodation area for passengers.

The advantageous arrangement of the battery on the lower level of the double-deck carriage results in a favourable weight distribution and advantageous driving dynamics when driving.

The rail vehicle can comprise a charge status indicator to show the charge status of the batteries.

Because of such a charge status display the operation of a rail vehicle becomes easy.

The charge status display can display the status of a battery. The charge status of several batteries can also be displayed on the charge status display.

The charge status display of the rail vehicle can display the remaining charging time until the battery is fully charged.

By displaying the remaining charging time until the battery is fully charged, the operation of the rail vehicle and the charging of the battery can be advantageously planned and executed.

It is possible for the charge status display to display the current remaining charging time until the battery is fully charged without taking into account further operation and power consumers of the rail vehicle. It is also possible that the charge status display indicates a remaining charging time until the battery is fully charged, taking into account the further anticipated operation and power consumption of the rail vehicle when calculating and displaying the remaining charging time.

The rail vehicle can be designed in such a way that power consumers of the rail vehicle that are not used for traction can be at least partially electrically connectable or connected to the battery power converter.

This means that power consumers of the rail vehicle that are not used for traction can be advantageously powered by the battery, even if the rail vehicle is not connected to an external power source, such as an overhead line.

The object of the invention is further achieved by a rail vehicle carriage for a rail vehicle as previously described comprising a high-voltage conductor electrically connectable to traction equipment and to a current collector. The traction equipment comprises at least one traction power converter and at least one traction motor. The rail vehicle carriage further comprises an energy storage system including an energy storage device. The energy storage device may be a battery. The energy storage system comprises a transformer. The transformer is associated with the energy storage device and electrically connected to the energy storage device and to the high-voltage conductor.

Such a rail vehicle carriage can be integrated particularly well into already existing train compositions and can be incorporated into the train composition of an ordinary train. Only minor modifications are required to the other components of the train composition. As a result, the train compositions can be operated advantageously. The energy storage system may include a battery. The energy storage system can also have an internal combustion engine or a fuel cell that converts fossil energy into electrical energy. Crucially, electrical energy is provided by the energy storage system.

The object of the invention is also achieved by a method for operating a rail vehicle as described above. In the method, the traction motor of the rail vehicle is at least temporarily and/or partially supplied with the electric current from the energy storage system.

The traction motor may be powered by a battery from the energy storage system. It is possible that the traction motor is supplied with power only from the energy storage system during the process. It is also possible that the traction motor is partially supplied with electrical power from the energy storage system and an external power supply at the same time.

The object of the invention is further achieved by a method for assembling a train composition, wherein a rail vehicle carriage as described above is added to an existing train composition.

The invention is explained in more detail in the following figures. Herein shows:

FIG. 1: A rail vehicle with a battery carriage with the associated schematic circuit diagram, 5 6

Figure 2:
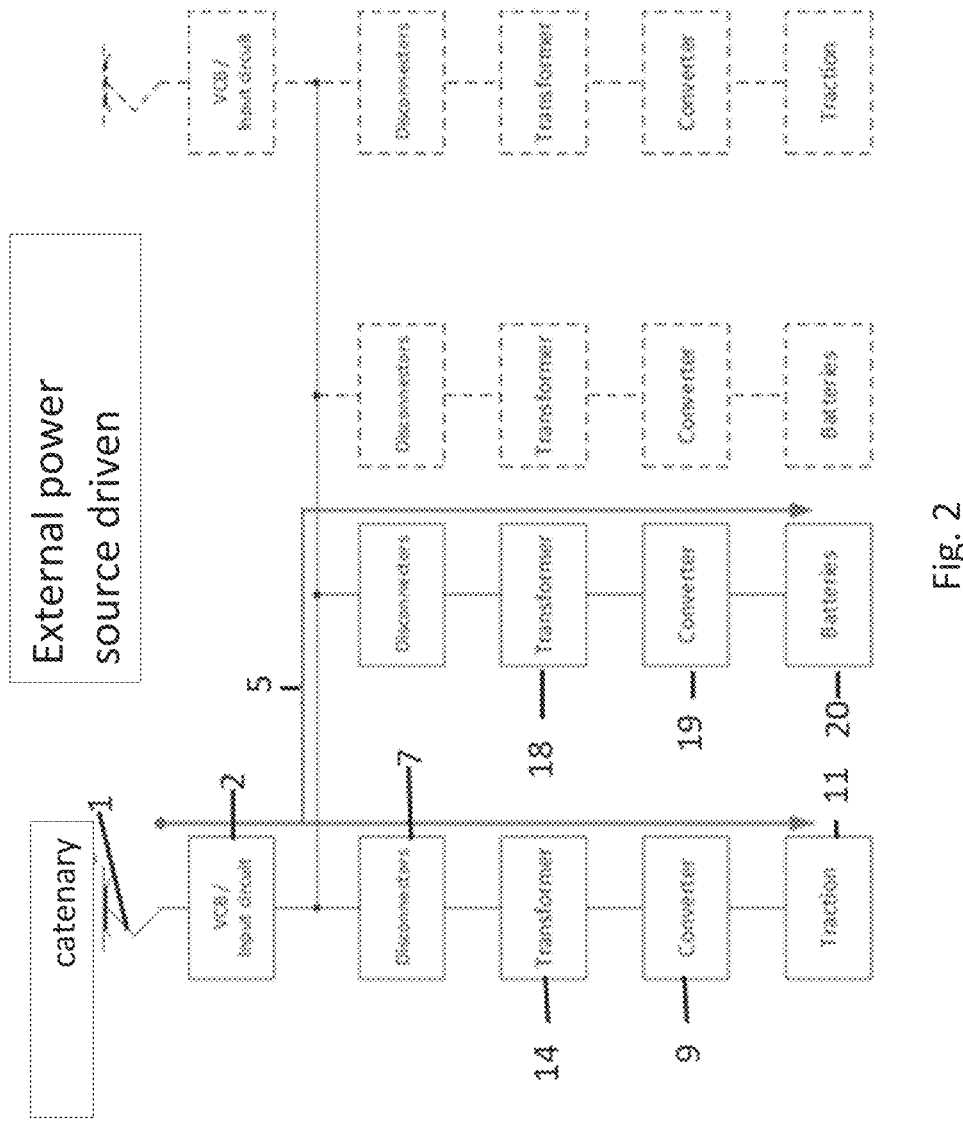
Figure 3:
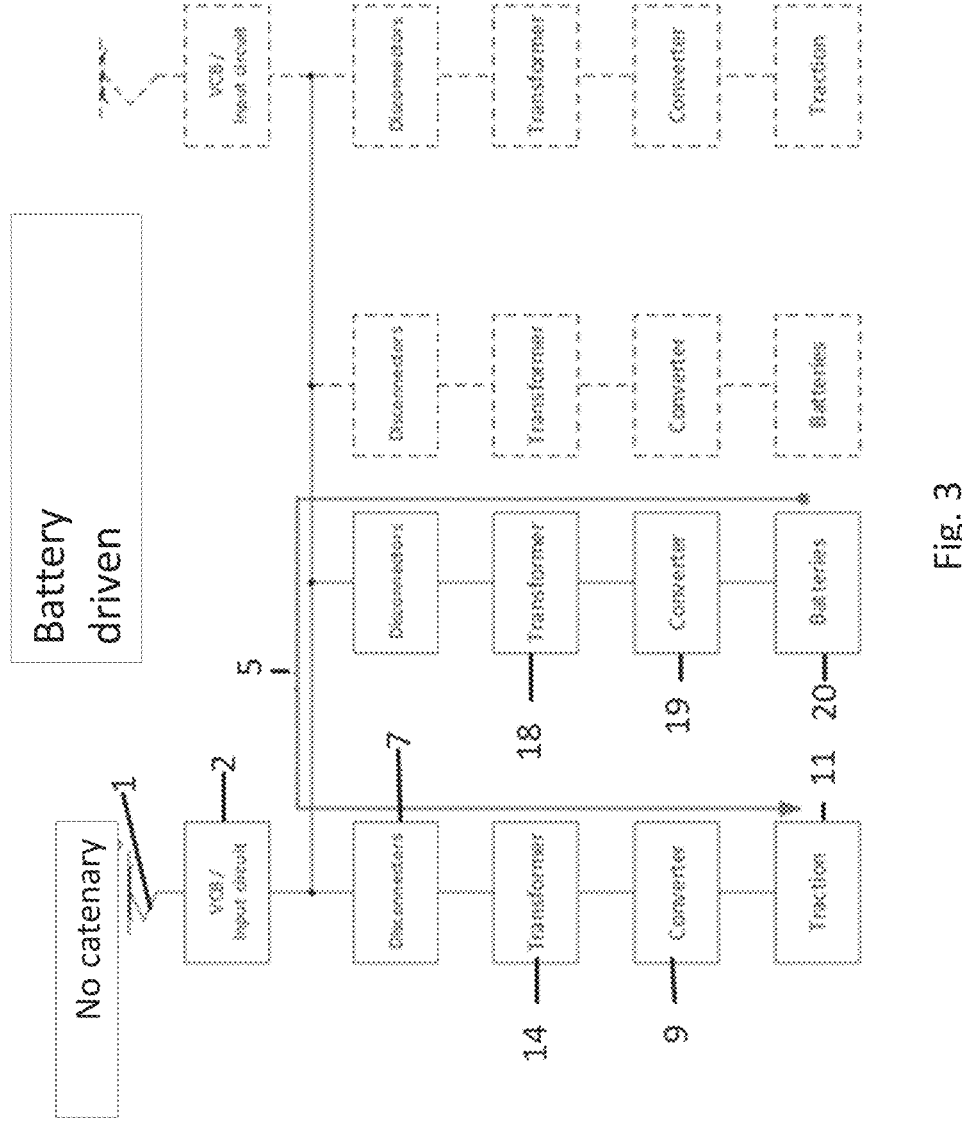
Figure 4:
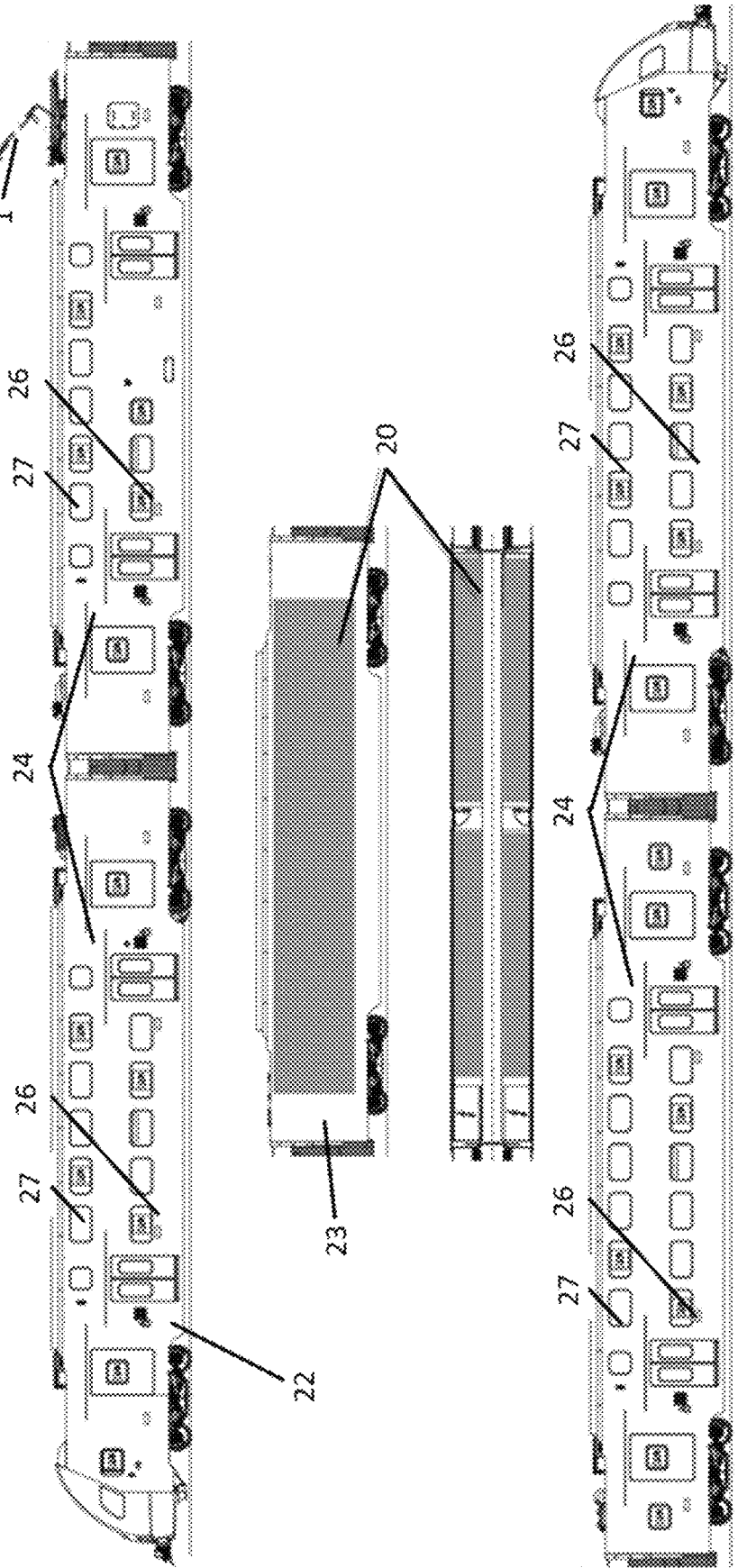
Figure 5:
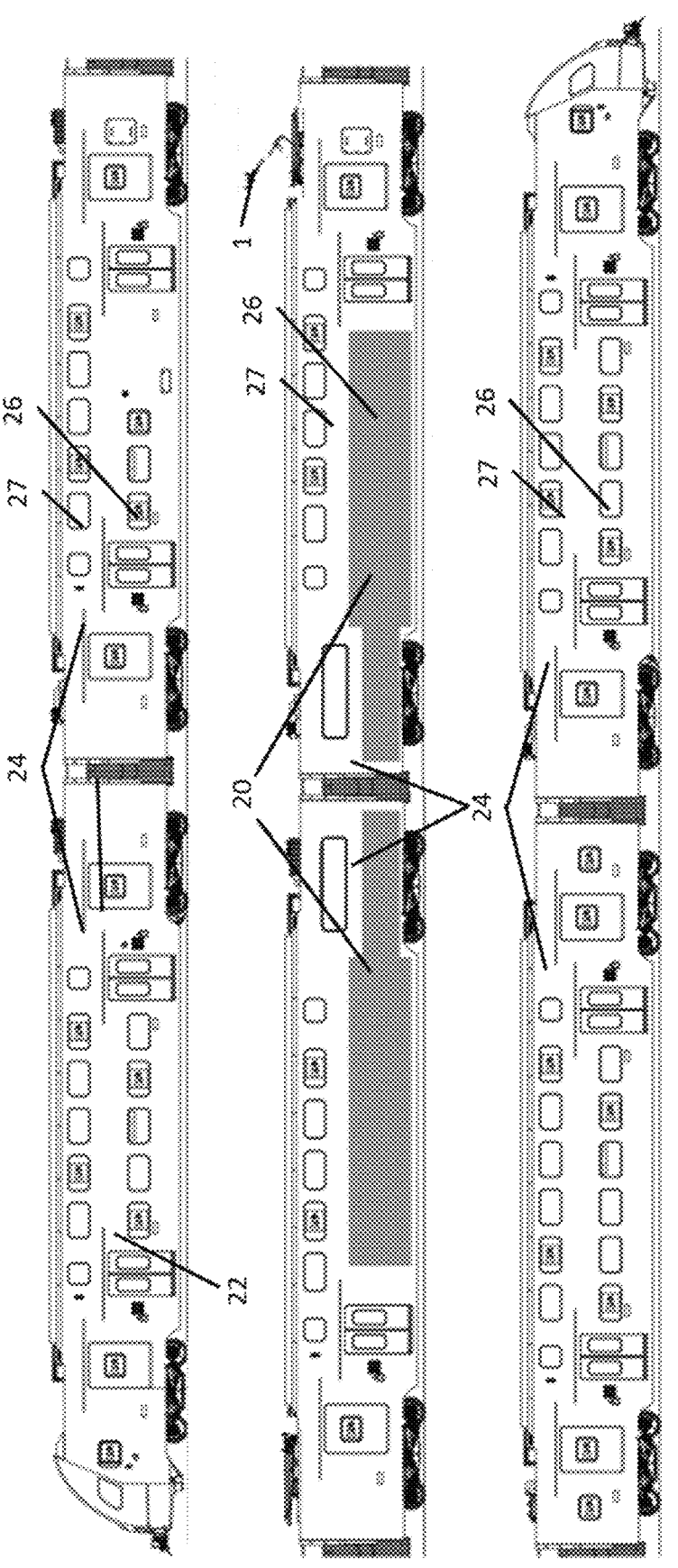
Figure 6:
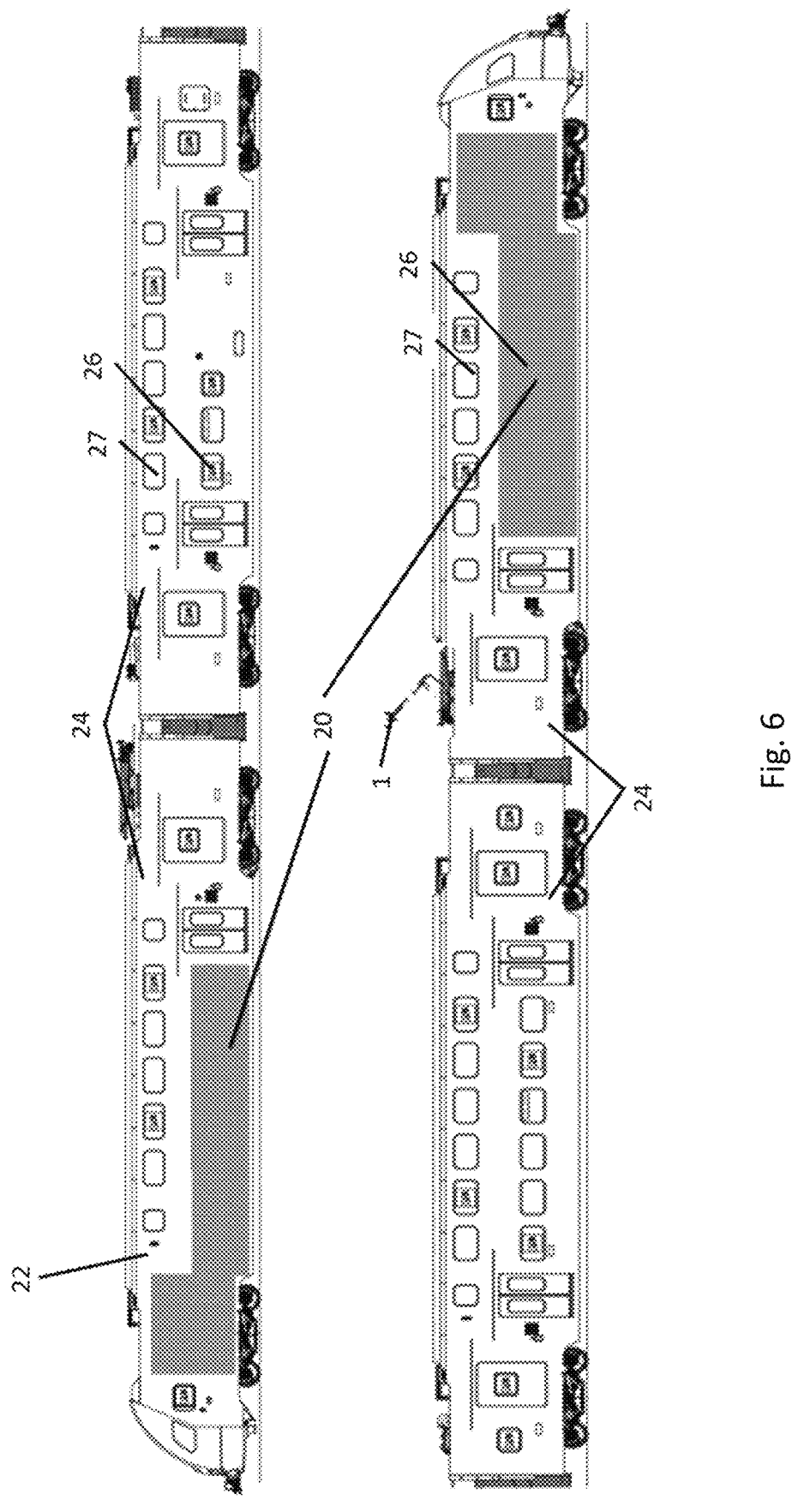

FIG. 2: a schematic circuit diagram of the rail vehicle according to FIG. 1, which is driven by an external power supply, FIG. 3: a schematic circuit diagram of the rail vehicle shown in FIG. 1, which is driven by a battery, FIG. 4: a possible vehicle configuration of a rail vehicle with a battery carriage, FIG. 5: an alternative vehicle configuration of a rail vehicle with two rail vehicle carriages with batteries, FIG. 6: an alternative configuration of a rail vehicle with two power carriages with batteries.

FIG. 1 shows a rail vehicle 22 with a battery carriage 23 and the associated circuit diagram. The rail vehicle 22 has a plurality of rail vehicle carriages 24. The rail vehicle carriages 24 have, in part, a lower level 26 and an upper level 27. The rail vehicle 22 has a current collector 1. The current collector 1 is connected to a high-voltage conductor 5 of the rail vehicle 22. A main switch 2 is arranged between the current collector 1 and the high-voltage conductor 5. Furthermore, a surge arrester 3 and a plurality of current and voltage sensors 4 are arranged between the current collector 1 and the high-voltage conductor 5.

The rail vehicle 22 further comprises a plurality of traction equipment 6.

The traction equipment 6 each includes a first system isolator 7, a first surge arrester 8, a traction motor 11, a traction transformer 14, an auxiliary drive converter 10, and operating ground brushes 12 and a traction power converter 9.

An energy storage system 15 is connected to the high-voltage conductor 5. The energy storage system 15 includes a second system isolator 16, a second surge arrester 17, a battery transformer 18, a battery power converter 19, a filter 21, a battery 20, and second operating ground brushes 12.

The rails 13 are disposed beneath the rail vehicle 22. The energy storage system 15 is separably connected to the traction equipment 6 as well as to the current collector 1 via the second system separator 16.

FIG. 2 shows the schematic circuit diagram of the rail vehicle of FIG. 1 (not shown), in an operating mode in which it is operated by means of an external power supply. Identical reference signs indicate the same components.

In the drive shown, electrical energy flows from an external power supply via the current collector 1 through the main switch 2, the first system isolator 7, the traction transformer 14 and the traction power converter 9 to the traction motor 11. In addition, electrical energy flows from the current collector 1 through the high-voltage conductor 5 and the battery transformer 18 to the battery 20.

Dashed lines show a possible second energy storage system and possible further traction equipment.

FIG. 3 shows the schematic circuit diagram of the rail vehicle 22 according to FIG. 1 in an operating mode in which it is driven by a battery 20. The current collector 1 is not connected to an overhead line. In this operating mode of the rail vehicle 22, the electrical energy flows from the battery 20 through the battery converter 19, the battery transformer 18, the high-voltage conductor 5, the first system isolator 7, the traction transformer 14 and the traction power converter 9 to the traction motor 11.

Dashed lines show a possible second energy storage system and possible further traction equipment.

FIG. 4 shows a possible vehicle configuration of a rail vehicle 22. The rail vehicle 22 has a plurality of rail vehicle carriages 24. One of the rail vehicle carriages 24 is designed as a battery carriage 23. The rail vehicle carriages partially have a lower level 26 and an upper level 27. The rail vehicle 22 has a current collector 1. The battery carriage 23 has a battery 20.

The rail vehicle 22 has three carriages and two power carriages. The battery carriage 23 is arranged in the middle of the composition of the rail vehicle 22. Thus, on each side of the battery carriage 23 there is another carriage and a power carriage. In this train composition, the battery 20 is located in a single battery carriage 23. The battery carriage 23 with the battery 20 does not include seating for passengers. The battery carriage 23 with the battery 20 has a passage area so that passengers can pass through the battery carriage 23 with the batteries 20 during operation of the train composition and thus pass from a carriage in front of the battery carriage 23 through the battery carriage 23 to a carriage behind the battery carriage 23.

FIG. 5 shows a possible train composition of a rail vehicle 22 with six rail vehicle carriages 24. Two of the rail vehicle carriages 24 are equipped with batteries 20. The rail vehicle carriages 24 have a lower level 26 and an upper level 27. Further, the rail vehicle 22 has a current collector 1. The two rail vehicle carriages 24 equipped with batteries 20 are located in the center of the train composition. The two rail vehicle carriages 24 equipped with batteries 20 are located side by side. Thus, one additional carriage and one power carriages are located before and after each of the two rail vehicle carriages 24 equipped with batteries 20. In this train composition, the batteries 20 are thus divided between two rail vehicle carriages 24. The rail vehicle carriages 24 with the batteries 20 each have an area in which the batteries 20 are arranged. The rail vehicle carriages 24 with the batteries 20 also have a passenger area in which passengers can stay. Further, the rail vehicle carriages 24 with the batteries 20 include a passenger boarding arrangement.

FIG. 6 shows a possible configuration of a rail vehicle 22. The rail vehicle 22 includes a plurality of rail vehicle carriages 24. The rail vehicle carriages 24 have a lower level 26 and an upper level 27. The rail vehicle 22 also has a current collector 1. The rail cars of the rail vehicle 22 are equipped with batteries 20. The batteries 20 are thus arranged in the power carriages. In this train composition of the rail vehicle 22, the batteries 20 are located in the power carriages, which are arranged at the end of the train. Between the two power carriages are two rail vehicle carriages 24. The rail vehicle carriages/power carriages 23 with the batteries 20 each have an area in which the batteries 20 are arranged. The rail vehicle carriages/power carriages 24 also have a passenger area in which passengers can be seated. Further, all of the rail vehicle carriages include a passenger boarding arrangement.

The invention claimed is:

1. A rail vehicle comprising:
a rail vehicle carriage;
a traction equipment comprising at least one traction converter and at least one traction motor;
a high-voltage conductor and a current collector, the high-voltage conductor electrically connects the traction equipment to the current collector; and
an energy storage system with an energy storage device wherein the energy storage system comprises a transformer which is associated with the energy storage device and is electrically connected to the energy storage device and to the high-voltage conductor and wherein the high-voltage conductor can selectively be supplied with high-voltage alternating current via the current collector by an external power supply and/or by means of the energy storage system.

2. A rail vehicle according to claim 1, wherein the high-voltage conductor is connectable to an external power supply via the current collector without components influencing the voltage in such a way that the high-voltage conductor and the traction equipment can substantially be supplied with the voltage and the frequency of the current of the external power supply.

3. A rail vehicle according to claim 1, wherein the high-voltage conductor and the traction equipment are adapted to be supplied with an AC voltage of substantially 25 kV at a frequency of substantially 60 Hz or 50 Hz.

4. A rail vehicle according to claim 1, wherein the energy storage system has an electrical frequency filter.

5. A rail vehicle according to claim 1, wherein the rail vehicle has at least one double-deck carriage.

6. A rail vehicle according to claim 1, wherein the rail vehicle comprises a plurality of rail vehicle carriages, wherein the at least one battery is arranged in exactly one battery carriage or in several of the rail vehicle carriages.

7. A rail vehicle according to claim 6, wherein the rail vehicle carriage comprising the battery is accessible for passengers to pass through the interior of the rail vehicle carriage.

8. A rail vehicle according to claim 6, wherein the rail vehicle carriage, which comprises the battery, comprises a lower level and an upper level.

9. The rail vehicle according to claim 8, wherein the battery is arranged on the lower level.

10. A rail vehicle according to claim 1, wherein the rail vehicle comprises a charge status display by means of which the charge status of the batteries can be displayed.

11. A rail vehicle according to claim 10, wherein a remaining charging time until the battery is fully charged can be displayed by the charge status display.

12. A rail vehicle according to claim 1, wherein power consumers of the rail vehicle which are not used for traction are connectable or are at least partially electrically connected to a battery converter.

13. A rail vehicle carriage for a rail vehicle according to claim 1, comprising:

a high-voltage conductor electrically connectable to traction equipment comprising at least one traction converter and at least one traction motor and to a current collector; and an energy storage system with an energy storage device, wherein the energy storage system has a transformer which is assigned to the energy storage device and is electrically connected to the energy storage device and to the high-voltage conductor.

14. The rail vehicle carriage for a rail vehicle according to claim 13, wherein the energy storage device is a battery.

15. The rail vehicle according to claim 1, wherein the energy storage device is a battery.

16. The rail vehicle according to claim 1, wherein the high-voltage conductor and the traction equipment are adapted to be supplied with an AC voltage of substantially 15 kV at a frequency of substantially 16.66 Hz.

* * * * *